United States Patent [19]

Lee et al.

[11] Patent Number: 4,968,255

[45] Date of Patent: Nov. 6, 1990

[54] ELECTRONIC INSTRUCTIONAL APPARATUS

[75] Inventors: Albert W. Lee, Kowloon; Wai-Kwok Chew, New Territories; David T. Cheung, Kowloon, all of Hong Kong

[73] Assignee: Video Technology Industries, Inc., Wheeling, Ill.

[21] Appl. No.: 221,261

[22] Filed: Jul. 19, 1988

[30] Foreign Application Priority Data

Oct. 8, 1987 [GB] United Kingdom ............... 8723594

[51] Int. Cl.⁵ ................................ G09B 1/00
[52] U.S. Cl. ..................... 434/159; 434/169; 434/170; 434/172; 434/201; 434/207; 434/327; 434/335; 434/340
[58] Field of Search ............ 434/159, 169, 170, 171, 434/172, 201, 207, 224, 258, 259, 327, 333, 335, 340

[56] References Cited

U.S. PATENT DOCUMENTS

| | | | |
|---|---|---|---|
| 3,389,479 | 6/1968 | Gross | 434/340 |
| 3,654,706 | 4/1972 | Perrella | 434/340 X |
| 3,795,063 | 3/1974 | Nelson | 434/169 X |
| 4,272,896 | 6/1981 | Lion | 434/340 |
| 4,516,260 | 5/1985 | Breedlove et al. | 381/51 |
| 4,526,550 | 7/1985 | Lurito | 434/340 |
| 4,729,564 | 3/1988 | Kuna et al. | 434/335 X |
| 4,846,692 | 7/1989 | Delcambre | 434/159 |

Primary Examiner—Richard J. Apley
Assistant Examiner—Joe H. Cheng
Attorney, Agent, or Firm—Dick and Harris

[57] ABSTRACT

An electronic instructional apparatus is provided wherein the operator engages in exercises in spelling, arithmetic and associational exercises by responding, in part, to audible prompts provided by the apparatus in the form of requests and/or questions to which the operator must respond. The requests and/or questions are based upon digital data stored within the memory representative of numbers, letters of the alphabet, colors and physical objects, such as commonly recognized animals. The operator responds to the requests and/or questions by inserting answer blocks into input cavities provided in the apparatus housing. Each answer block has disposed thereon a plurality of display faces bearing indicia representative of potential responses to the presented statements and/or questions. Each display face has corresponding input surfaces which cooperate with detection elements to input into said apparatus the response selected by the operator. The apparatus further comprises speech snythesis and sound production elements to produce the audible presentations.

17 Claims, 3 Drawing Sheets

ELECTRONIC INSTRUCTIONAL APPARATUS

BACKGROUND OF THE INVENTION

This invention relates to electronic learning aids and teaching machines, and particularly, to an electronic instructional apparatus which is capable of producing audible presentations and which is suitable for use by an operator who is in a preliterate stage of development, such as a preschool age child. The apparatus according to the present invention utilizes response association training in exercises involving spelling, counting and object and color identification.

Electronic instructional apparatus are well known in the prior art. These apparatus are primarily devoted to the instruction of mathematical and spelling skills through the utilization of visual displays which are presented to the child. Several prior art devices operated by presenting upon a visual display screen a mathematical operation to be solved or performed by the operator, through inputting the correct response into the apparatus through a keyboard. Other forms of prior art devices utilize visual displays and visual aids such as picture books to present questions or spelling exercises to the operator of the apparatus. Many of these types of prior art devices do not incorporate speech systhesis features for asking questions or otherwise soliciting responses from the child operator via a synthesized human voice thus often requiring that the child operator have at least minimal reading skills, or alternatively, that the child be assisted in using the apparatus by another individual, often the parent.

An additional prior art device is disclosed in U.S. Pat. No. 4,516,260 issued to Paul S. Breedlove and James H. Moore and assigned to Texas Instruments, Incorporated. The apparatus described therein is capable of making audible presentations to the operator, requiring the operator to provide a response through a keyboard forming part of the apparatus. The apparatus is further capable of operating in a plurality of modes of operation which require the operator to perform a number of different types of spelling and associational exercises. Unfortunately, however, many of these types of prior art devices have nevertheless required that the operator have a certain level of intelligence and coordination to operate the device, skills which may exceed that of the typical preliterate child of preschool age.

A potential disadvantage to such prior art devices is their reliance upon standard alpha-numeric keyboards as input devices. Typically, a preschool aged child is unable to effectively operate such a standard adult keyboard due to the young child's lack of coordination. Moreover, the prior art often utilized keyboards which are visually unstimulating to young children who accordingly may become tired of such prior art devices and thus not use and benefit from them.

It is, therefore, an object of the present invention to provide an electronic instructional apparatus for a preschool aged, preliterate operator that is visually stimulating and easily useable by children of such age and development.

It is a further object of the present invention to provide an electronic instructional apparatus which provides questions and requests in a manner which the child may comprehend.

It is another object of the present invention to provide an input device which may be manipulated by young children who may lack fully developed coordinational skills and which simultaneously teaches spelling, counting and identification skills with developing the child's coordination.

It is another object of this invention to provide an electronic instructional apparatus which is capable of providing audible presentations of spelling, mathematical, and associational exercises to a preschool age operator.

It is yet another object of this invention that the instructional apparatus be capable of presenting questions or problems in a randomly selected manner, within each mode of operation.

It is another object of the instructional apparatus to provide that the operator present physical responses to audibly presented questions or statements.

It is another object of this invention to provide an instructional apparatus which provides positive audible reinforcement for the operator thereof.

It is another object of this invention to provide an instructional apparatus which provides responses to an operator corresponding to the correctness or incorrectness of the operator's responses to the questions or statements presented by the instructional apparatus.

It is yet still another object of this invention to provide an instructional apparatus which is portable and is durable and inexpensively constructed.

These and other objects of the invention will become apparent in light of the present specification and drawings.

SUMMARY OF THE INVENTION

The present invention comprises an electronic instructional apparatus for developing and testing a preliterate preschool child's associational and coordinational skills. The apparatus is contained within a housing which, in the preferred embodiment, consists of a stylized school bus. The housing includes in the preferred embodiment four recesses on the front face thereof. Indicia disclosure means are provided which bear indicia on at least one side thereof wherein said indicia disclosure means are capable of being inserted into one or more of the recesses contained within the apparatus housing. The indicia disclosure means are inserted into the recess means such that the indicia which is contained upon the indicia disclosure means appears upon an exposed side of the indicia disclosure means when it is inserted into a recess means.

A memory means is provided for storing data which corresponds to the indicia appearing upon said side of each of said indicia disclosure means. The memory similarly stores data representing a plurality of predetermined combinations of said indicia which appear upon exposed sides of combinations of at least two indicia disclosure members inserted into said recess means. A processor means is provided and is operably associated with the memory means and the detection means, for comparing the identity of the indicia which appears upon the side of each of said inserted indicia disclosure means with the data stored in the memory means. Similarly the processor means is associated with the memory means and the detection means, for comparing the identity of combinations of indicia which appear upon sides of combinations of inserted indicia disclosure means with the data stored in the memory means. The processor means further provides an indication that the identified indicia, appearing on the sides of one or more of the indicia disclosure means which have been inserted into the recess means, is alternatively present, or not present, as data stored in the memory means. An output means is provided and is operably associated with the processor means for providing the operator with an output which is a function of the data stored in the memory means.

In the preferred embodiment of the invention the recess means comprises a cavity disposed in the front surface of the housing means wherein the cavity has a rectangular opening on an exterior surface of the housing means and extends rectangularly into an internal portion of the housing means such that a cavity is formed which is capable of accepting the insertion of one of the indicia disclosure means. Preferably, the indicia disclosure means comprise cubical answer blocks where each answer block has disposed thereon at least one display face wherein each display face bears thereon operator identifiable visual indicia. In the preferred embodiment of the invention the cubical answer block contains six display faces wherein each of the six faces bears thereon different operator identifiable visual indicia. Moreover, each one of the answer blocks includes for each particular display face a plurality of corresponding identification surfaces which are engageable with the detection means contained within the recess means. The identification surfaces are disposed upon the sides of the answer block which are perpendicular to the given display face and the identification surfaces are further disposed upon the portion of each of the perpendicular sides which is distal to the particular display face. Accordingly the detection means is engaged with the identification surface corresponding to the display face projecting outwardly from the recess means so long as the answer block is inserted into the recess means.

In the preferred embodiment of the invention, the identification surface comprises a plurality of ridges and notches upon the distal edge of the perpendicular side where the arrangement of ridges and notches represent digital data which identify the color of the answer block and the indicia appearing upon the outwardly projected display face and wherein said digital data is stored in the memory means. Accordingly, the detection means are disposed upon the interior surface distal to the opening of each one of the cavities such that upon insertion of an answer block into a cavity, the identification surface is brought into operable engagement with the detection means. In the preferred embodiment of the invention, the detection means comprise a plurality of switches disposed within each of the cavities where the switches are in alignment with and are responsive to the ridges and notches comprising the identification surfaces of the answer blocks such that the detection means will provide a digital data signal to the processor means representative of the indicia present on the exposed side of the indicia disclosure means when inserted in the cavity.

In the preferred embodiment of the invention the electronic instructional apparatus further includes software with said memory means for providing the child operator with a plurality of requests to which operator responses are desired and for providing the correct responses to the operator corresponding to the plurality of requests. The operator responses are provided by the insertion of one or more of the indicia disclosure means into one or more of the recess means in response to said request. As will be explained herein under the modes of operation, the invention is capable of operating in several different modes having different types of requests and requiring different types of operator responses. The software preferably includes a memory portion for storing the plurality of requests and a memory portion for storing the corresponding correct responses as well as speech synthesis means operably associated with the memory means and processor means for providing the plurality of requests and the corresponding correct responses to the operator in synthesized human speech.

In one mode of operation the output of the electronic instructional apparatus provides the operator with an indication of the identity of the indicia appearing upon the exposed side of a particular indicia disclosure means when that indicia disclosure means is inserted into one of the recess means. In another mode of operation the software makes requests of the operator which require the operator to identify specific indicia appearing upon particular indicia disclosure means and requiring the operator to insert particular indicial disclosure means into one of the recess means such that the requested indicia appears upon the exposed side of the indicia disclosure means. An additional mode of the invention includes software which make requests of the operator to spell a given word thus requiring the operator to identify the specific combination of indicia appearing upon particular indicia disclosure means which form the correct spelling of the word and insert the particular combination into the recess means so as to correctly spell that particular word. Still another mode of the invention includes software which makes requests of the operator towards teaching the operator counting by requesting the operator to insert a specific number of indicia disclosure means into the recess means, without regard for the indicia contained thereon. The software may further teach the operator to recognize color by use of indicia disclosure means which are of different color in association with software which request the operator to insert specific numbers of colored indicia disclosure means into the recess means.

In the preferred embodiment of the invention the electronic instructional apparatus further produces a predetermined series of audible musical sounds upon the insertion of said indicia disclosure means into said recess means wherein the musical sounds as a function of the indicia appearing upon the exposed side of the indicia disclosure means. Moreover, the invention includes means for producing a predetermined series of audible animal sounds upon the insertion of said indicia disclosure means into the recess means where the animal sounds so produced correspond to the indicia appearing upon the exposed side of the indicia disclosure means.

MODES OF OPERATION

The instructional apparatus of the preferred embodiment has 6 basic modes of operation. It will be evident to those skilled in the art, however that these modes of operation may be modified, reduced in number, or expanded in capability without departing from the spirit of the present invention. As a matter of design choice, the instructional apparatus of the preferred embodiment is provided with the following modes of operation.

When the "on" button is depressed, the instructional apparatus will begin to operate in the mode of operation which is indicated upon that portion of the operation mode selector switch which is in a designated selection position. If the operation mode selector switch is in the "tells it" mode position, the following procedure will take place. The electronic circuitry within the instructional apparatus will cause an audible presentation to be played through the above-described speaker, requesting that one of the answer blocks be inserted into one input cavities. When one of the answer blocks is placed in an empty input cavity, the particular combination of sensor switches which are depressed as a result of the insertion of the answer block will cause the electronic circuitry to produce an audible presentation which identifies the indicia displayed upon the exposed display face of the inserted answer block. If the exposed indicia comprise either letters or numerals, only an audible statement identifying the letter of numeral will be produced. If however, the indicia represent physical objects, such as easily identified animals, in addition to the statement identifying the indicia, sounds representative of the displayed physical object will be produced. By using the just described procedure, a child operator may be instructed as to the identity of the indicia disposed upon each of the display faces of each of the answer blocks.

The second mode of operation of the instructional apparatus can be achieved by rotating the operation mode selector switch to the "letters" position. Upon selection of the "letters" mode of operation, the electronic circuitry will randomly select, from the letters which are stored within its associated memory means, a particular letter and cause an audible presentation to be produced by the aforementioned speaker which requests that the answer block bearing the selected letter be inserted into one of the input cavities, with the selected letter disposed upon the exposed display face. For example, if the electrical circuitry within the instructional apparatus randomly selects the letter "b", the instructional apparatus will produce the audible presentation, "please give me the letter 'b'" In the "letters" mode of operation, a correct response to the just described audible presentation occurs only if the answer block bearing the letter "b" is inserted into a vacant input cavity with the letter "b" disposed upon the exposed display face. If the response provided by the operator is correct, the instructional apparatus will produce a corresponding audible presentation acknowledging the correct response, for example "yes, you are right". If an incorrect response is provided, the instructional apparatus will produce an audible presentation which identifies the incorrectly inputted display face which is exposed and repeat the prior request for the randomly selected letter. The request for the particular randomly selected letter will be repeated until a correct respond is provided.

The third mode of operation of the instructional apparatus according to the preferred embodiment is the "spelling" mode of operation. When this mode of operation is selected the electronic circuitry will randomly select from within its memory means a word which the operator will be requested to spell. An audible presentation will be produced requesting the correct spelling of the randomly selected word. A correct response will occur only when blocks bearing the indicia representing the correct spelling of the requested word are inserted in proper order into consecutively arranged input cavities. The individual blocks bearing the individual letters may be inserted in any sequence so long as the letters appear in the proper literal sequence upon completion of the response. An audible presentation identifying each block will occur after insertion of the particular block. If an incorrect response, such as an inappropriate letter, is inputted, the electronic circuitry will produce an audible presentation identifying the incorrect response and repeating the requested word to be spelled.

If a correct response is provided by the operator, an audible presentation acknowledging the correct response will be produced. After a maximum of 4 incorrect attempts to provide a correct response for a given selected word, an audible presentation providing the correct response will be produced. Only words which contain letters found on separate blocks are stored within the memory means of the electronic circuitry. Furthermore, in order for a response to be correct, the answer block bearing the first letter of the response must be inserted in the left-most input cavity, with the remaining blocks in the next adjacent cavities, in proper order.

The fourth mode of operation of the instructional apparatus is the "numbers" mode of operation. This mode of operation is substantially similar to the "letters" mode of operation. In the preferred embodiment, the numerals 1 through 10 are represented upon the various answer blocks. Upon activation of this mode of operation, the electronic circuitry will randomly select from those numerals and produce an audible presentation requesting that one of the numerals be provided. As with the "letters" mode of operation, in order for a response to be correct, the correct answer block with the appropriate numeral must be inserted into one of the input cavities with the requested numeral upon the exposed face. In the event of an incorrect response, an audible presentation identifying the indicia upon the exposed display face will be provided. The audible presentation requesting the particular selected numeral will be repeated until a correct response is provided, at which time the electronic circuitry will randomly select another numeral to be identified and provided by the operator.

The fifth mode of operation, which is the most complicated interactive mode of operation, is the "counting" mode of operation. The "counting" mode of operation includes five levels of difficulty. Within each level of difficulty, audible presentations responsive to the appropriateness or inappropriateness of the response provided by the operator will be produced. It is necessary for the operator to produce 4 consecutive correct responses to proceed for the first level to the second level, from the second level to the third level, and from the third level to the fourth. In order to proceed from the fourth level to the fifth level, 8 correct responses must be given consecutively. During first level of difficulty operation, the operator is requested to insert randomly selected numbers of answer blocks into the input cavities. During the second level of difficulty operation, the operator is requested to insert answer blocks bearing randomly selected numbers of letters. During the third level of difficulty operation, the operator is requested to insert answer blocks of randomly selected number and color. During fourth level of difficulty operation, the operation is requested to insert blocks whose exposed display faces bear, in the aggregate, a randomly selected number of the above-described physical objects or readily identified animals. Fifth level of difficulty operation provides that questions embodying each of the 4 other levels of operation will be presented to the operator. If an incorrect response is provided, an audible presentation stating the incorrect response and repeating the original presentation, will be produced. Because a correct response may require the insertion of more than one block at a time, after each response by the operator, during "counting" operation, all answer blocks must be removed from all input cavities after each operator response.

The sixth mode of operation, which is a noninteractive mode of operation, is the "music" mode of operation. In this mode of operation, the operator, through the selective insertion of the answer blocks, may cause a production of musical notes and/or animal sounds. A different portion of musical passage is associated, within the memory means of the electronic circuitry, with each of the display faces bearing either a numeral or a letter. Each display face which depicts an animal or animals, produces, when inserted into an input cavity, audible presentations comprising animal noises appropriate for the animals disposed upon the particular display face which is exposed. When more than one answer block is inserted into the input cavities at a given time, the sounds associated with the exposed display faces will be produced in the order in which the associated blocks were inserted into the input cavities. No voices or words are included in the audible presentations produced in the "music" mode of operation.

DETAILED DESCRIPTION OF THE DRAWINGS

Figure 1:
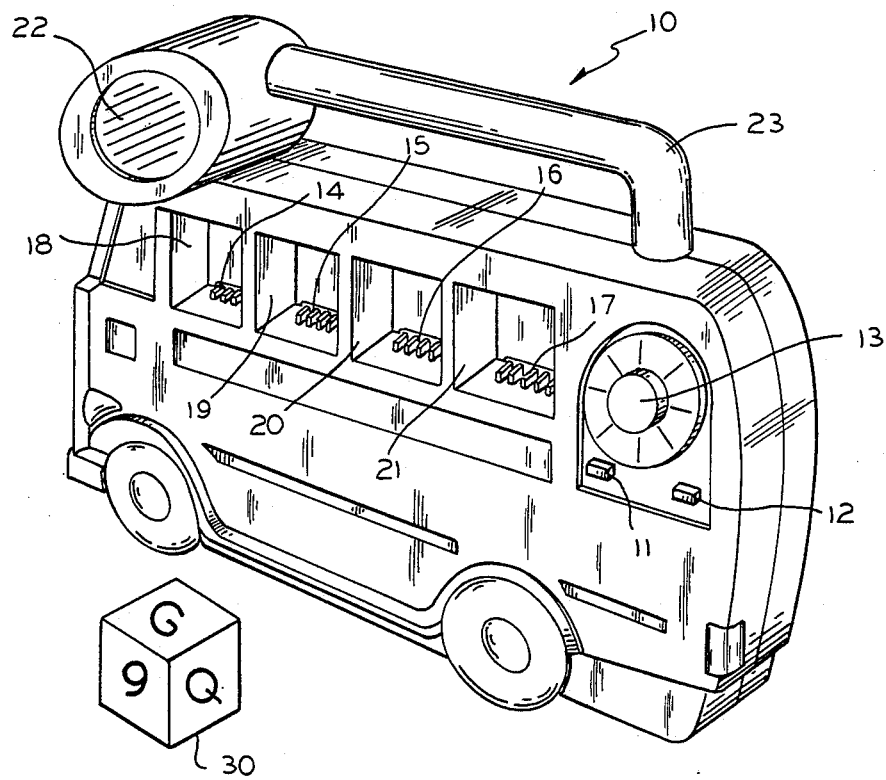
FIG. 1 is a side perspective view of the electronic instructional apparatus according to the present invention. The rectangular input cavities for insertable reception of the associated answer blocks are particularly shown.

While this invention is susceptible of embodiment in many different forms, there is shown in the drawings and will herein be described in detail a specific embodiment, with the understanding that the present disclosure is to be considered as an exemplification of the principles of the invention and is not intended to limit the invention to the embodiment illustrated.

FIG. 1 is a front right-side perspective view of the electronic instructional apparatus. Instructional apparatus 10 is shown principally comprising case 23, in which is mounted electronic circuitry (not shown in this figure) and one of a plurality of answer blocks 30. The circuitry is coupled to "on" switch "off" switch 12, operation mode selector switch 13, and detection sensor groups 14, 15, 16, and 17, which are disposed within input cavities 18, 19, 20, and 21, respectively. The electronic circuitry is also connected to an audio speaker (not shown), which is mounted behind grill 22. Case 23 may be configured to have any suitable shape, although in the preferred embodiment case 23 is shown as being configured so as to resemble a stylized school bus. The operator, by rotating the operation mode selector switch 13, may change the mode of operation of the electronic instructional apparatus 10. Also shown in FIG. 1 is one of a plurality of answer blocks 30, any one of which may be inserted into any one of input cavities 18-21. The three exposed sides of answer block 30 are shown as bearing indicia thereon. The cooperation of the answer block 30 and input cavities 18-21 are described in detail hereinafter.

Figure 2:
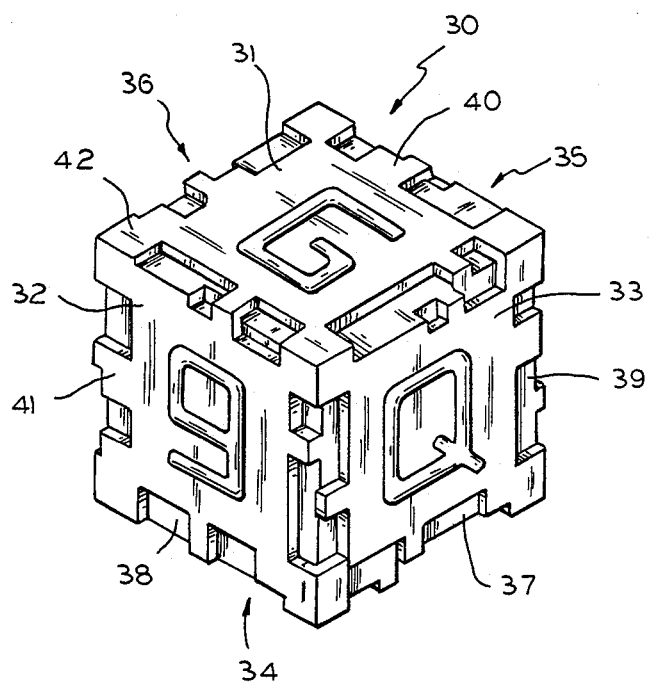
FIG. 2 is a side perspective view of an answer block, showing, in particular, the identification surfaces associated with the display faces.

An answer block 30, according to the present invention, is seen in perspective view in FIG. 2 and three display faces 34, 35 and 36 are not seen. In the preferred embodiment of the invention, each answer block 30 is a cube, and has 6 generally square display faces of which three display faces 31, 32, and 33 are seen in FIG. 2. Each display face bears indicia, such as numerals, letters of the alphabet, or images of physical objects (not shown), such as numbers of commonly known and easily recognized animals, the indicia so described being representative of potential responses to statements or questions posed by the instructional apparatus, or musical sounds, in a matter to be hereinafter described. If the operator wished, for example, to utilize the numeral 9 as seen in FIG. 2, as a response to a question posed by the apparatus, the operator would locate the answer block which bears the numeral 9 upon one of its display faces and in this example insert answer block 30 into one of the input cavities 18-21, so that display face 32, bearing the numeral 9, would be turned toward the operator. It will be seen that the desired indicia need only appear facing the operator and need not necessarily be "right side up". In order for the instructional apparatus of the present invention to recognize what indicia are displayed on the exposed display face of an inserted answer block 30, each answer block 30 also bears a plurality of input surfaces, corresponding to the 6 display faces of the answer block. The input surfaces corresponding to a given display face are disposed upon the distal edges of the display faces perpendicularly disposed to the given display face. For example, as seen in FIG. 2, the input surfaces 37, 38 correspond to display face 31, which bears the letter G. In addition to the input surfaces which are seen, it is readily understood that 2 additional input surfaces, corresponding to display face 31, extend along the lower edges of the answer block 30, which edges are not seen from the view shown in FIG. 2. Similarly, input surfaces 39 and 40 correspond to display face 32, which bears the numeral 9; further input surfaces 41 and 42 correspond to display 33, which bears the letter Q. In the preferred embodiment of the invention, the 4 input surfaces corresponding to each display face are identical with each other. Furthermore when a block is inserted into one of input cavities 18-21, only the lower one of the input surfaces corresponding to the exposed display face comes into contact with the detection sensor group of the particular input cavity. Since all of the input surfaces corresponding to a given display face are identical, it can be readily seen that the orientation of the indicia of the exposed display face with respect to the horizontal and vertical directions is immaterial to the operation of the apparatus according to the present invention.

Figure 3:
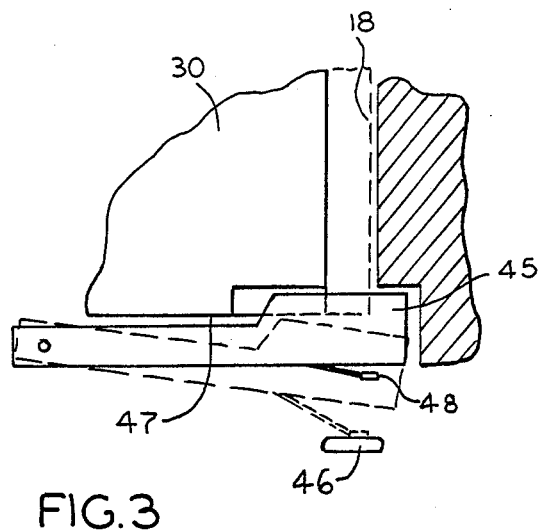
FIG. 3 is a side view, partly in section, of the detection means shown cooperating with an answer block. Positioning of the detection means is shown both before and after insertion of the answer block.
Figure 4:
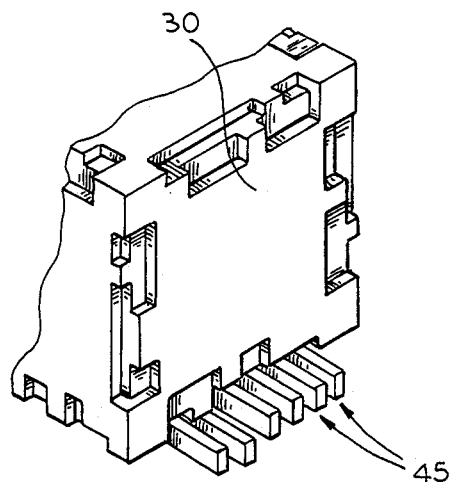
FIG. 4 is a reverse angle perspective view of the cooperation of the sensor switches, and an answer block, according to FIG. 3.

FIGS. 3 and 4 illustrate the cooperation of the input surfaces of the answer blocks and the detection sensor groups disposed within the input cavities. Each input surface, as seen in FIG. 2, includes a plurality of notches and ridges, the particular combination of which is unique to its corresponding display face. Inasmuch as the various answer blocks, a plurality of which are contemplated in the preferred embodiment of this invention, are fabricated of various colors, the input surfaces of a given answer block are also representative of the color of said answer block as well as the particular indicia of a given display face.

Each of detection sensor groups 14-17 (as seen in FIG. 1), comprises a plurality of sensor switches 45, one of which is illustrated in FIG. 3. Insertion of an answer block causes the notches and ridges of the answer block to align with the individual detection switches which make up a detection sensor group. Sensor switch 45 is shown prior to insertion of an answer block in an initial unactuated position by the solid lines of FIG. 3. Sensor switch 45 is held in the unactuated position by a biasing means (not shown). Upon insertion of an answer block, detection switch 45 will remain biased in an unactuated position or alternatively will be depressed and thus actuated depending upon whether a notch or ridge, respectively, is aligned with said detection switch 45.

As seen in FIG. 3, the input surface 47, which extends along a lower portion of answer block 30, away from the corner most portion of block 30, corresponds to the display face which is being exposed during insertion of the block. Upon complete insertion of block 30, as indicated by the dashed lines, sensor switch 45 is depressed away from its initial position, and is brought into contact with terminal 46. Both terminals 46 and lead 48, which is supported by sensor switch 45, are operably associated with the above-described electrical circuitry so that when terminal 46 and lead 48 are brought into contact, a signal is sent to said electrical circuitry. Although in the preferred embodiment of the present invention, 6 sensor switches are contemplated within each input sensor group, as a matter of design choice, any number of sensor switches may be utilized within an input sensor group, depending upon the amount of information which is desired to be represented by each input surface. Since the input surfaces corresponding to each display face are different from the input surfaces corresponding to the other display faces of the answer blocks contemplated in this invention, each combination of depressed and undepressed sensor switches 45 create, when inserted into an input cavity, a signal which identifies, within memory means included in the aforesaid electronic circuitry, stored characteristics of the particular exposed display face and the answer block upon which the particular display face is disposed.

Figure 5:
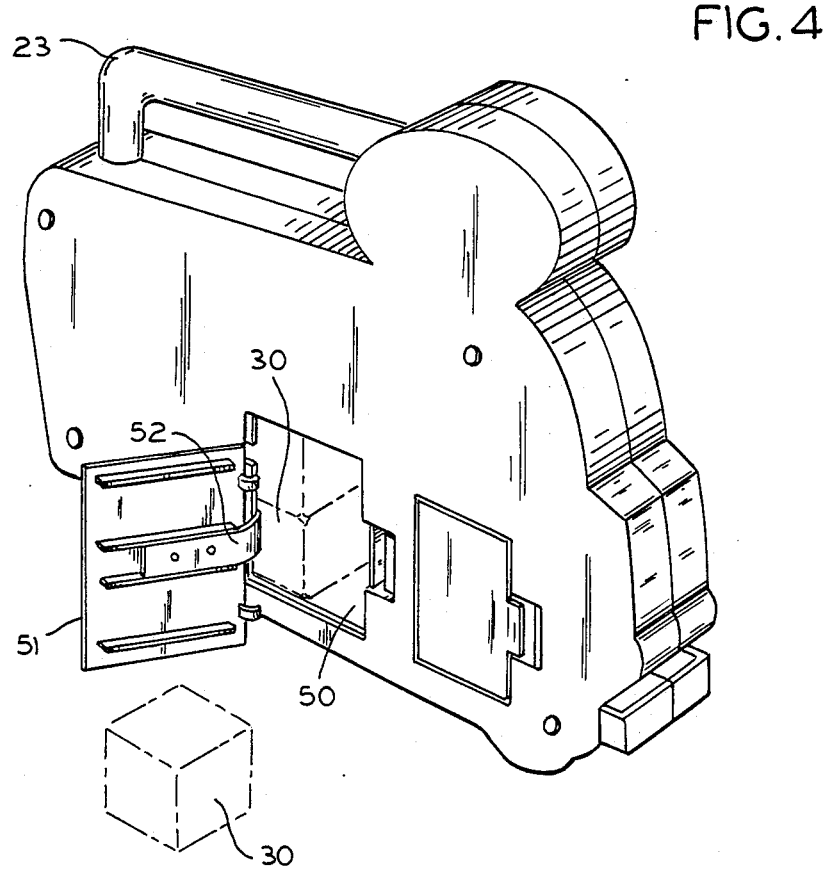
FIG. 5 is a rear left-side perspective view of the back side of the apparatus in which is shown the storage compartment for the containment of the answer blocks.

FIG. 5 shows a rear view of the instructional apparatus according to the present invention and specifically shows a storage cavity 50 which may be sealed by closure 51. Cavity 50 provides a place where answer blocks 30 may be stored when the apparatus is being transported, or is otherwise not in use. Closure 51 is shown affixed to a portion of case 23 by strap 52 to prevent closure 51 from being separated from case 23 and thus lost.

Figure 6:
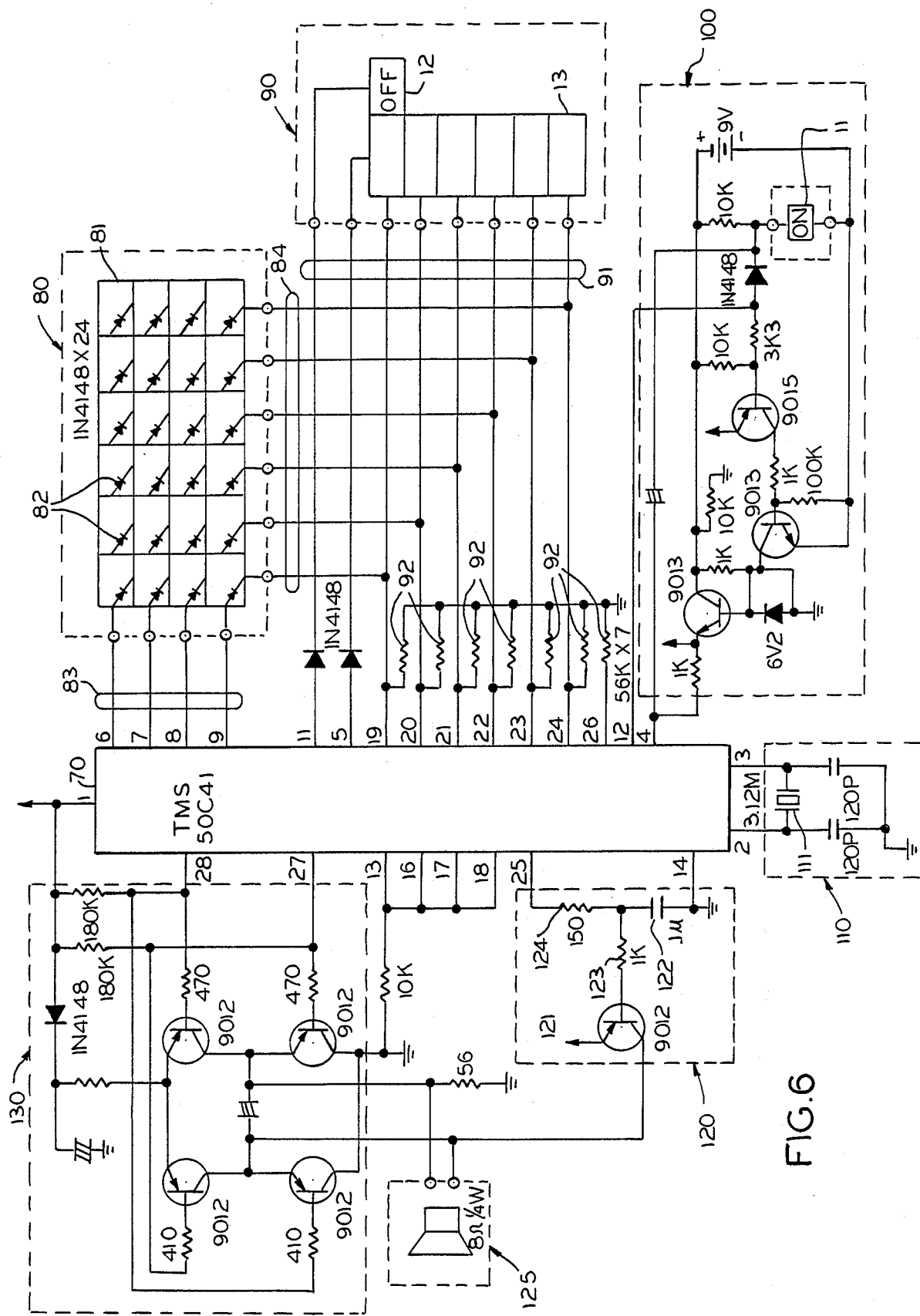
FIG. 6 is a schematic diagram of the electronic circuit means comprising the memory means, and processor means. Also shown are the various amplifier, power supply and switching sub-circuits.

FIG. 6 of the drawings is a schematic circuit diagram of the electronic instructional apparatus of the present invention. Integrated circuit chip 70 is shown connected to the various amplifier, power supply and switching sub-circuits. Integrated circuit chip 70 comprises a single chip which internally incorporates a central processing unit, read-only-memory, random-access-memory, speech systhesis and sound production circuitry and input/ouput control circuitry. Chip 70 thus contains the software which produces the various requests to the operator as well as contains in various memory portions the identification of the different indicia appearing upon the above-described answer blocks. Such types of single chip systems are well known in the art.

Subcircuit 80 illustrates detection switch matrix 81 which is composed in the preferred embodiment of six detection switches for each of the four input cavities. Diodes 82 serve to separate each detection switch from short circuit. Switch matrix 81 is connected to integrated circuit chip 70 by lines 83 and 84.

Subcircuit 90 illustrates the "off" switch 12 and operation mode selector switch 13 of FIG. 1. Off switch 12 and operation mode selector switch 13 are connected to integrated circuit chip 70 by lines 91 which are shown buffered by resistors 92.

Subcircuit 100 shows the power control circuit of the electronic instructional apparatus, and specifically "on" switch 11. The operation of this power control circuit is common and well known to those skilled in the art. Subcircuit 110 is connected to integrated circuit chip 70 and comprises crystal 111 for providing the timing signals to the central processing unit contained in integrated circuit chip 70.

Subcircuit 120 is a simple amplifier circuit composed of transistor 121, capacitor 122 and resistors 123 and 124 and serves to amplify in a standard manner musical sounds produced by the apparatus and heard through speaker 125. Subcircuit 130 is another common amplifier circuit known to those skilled in the art and serves to amplify the sythesized human speech produced by the speech systhesis element contained in integrated circuit chip 70.

What is claimed is:

1. An electronic instructional apparatus for developing and testing a preliterate preschool aged operator's associational and coordinational skills, said electronic instructional apparatus comprising:

(a) housing means, said housing means including at least two recess means;

(b) at least two indicia disclosure means bearing indicia on at least one side of each of said indicia disclosure means, each of said indicia disclosure means being capable of insertion into any one of said recess means, whereupon insertion of said indicia disclosure means into any one of said recess means, at least one side bearing indicia remains exposed to the operator, said exposed side bearing said indicia projecting outwardly of said recess means;

(c) detection means operably associated with each of said recess means for detecting the insertion of said indicia disclosure means into any one of said recess means and for providing an indication of the indentity of said indicia appearing upon said exposed side of said disclosure means inserted into any one of said recess means;

(d) memory means for storing data corresponding to said indicia appearing upon each side of each of said indicia disclosure means, and for storing data representing a plurality of combinations of said indicia which appear upon the exposed sides of combinations of at least two of said indicia disclosure means inserted into said recess means;

(e) processor means operably associated with said memory means and said detection means for comparing the identity of said indicia appearing upon said exposed sides of each of said inserted indicia disclosure means and the identity of combinations of said indicia appearing upon said exposed sides of said combinations of at least two of said indicia disclosure means inserted into said recess means with said data stored in said memory means, and for providing an indication that said identified indicia appearing on said exposed sides of said inserted indicia disclosure means is correctly present or incorrectly present as said data stored in said memory means; and output means operably associated with said processor means for providing said operator with an output which is a function of data stored in said memory means.

2. The electronic instructional apparatus according to claim 1 in which each of said recess means comprises a cavity disposed in said housing means, said cavity having a rectangular opening upon an exterior surface of said housing means and extending to an internal portion of said housing means wherein said cavity is capable of accepting the insertion of one of said indicia disclosure means.

3. The electronic instructional apparatus according to claim 2 in which each said indicia disclosure means comprises a cubical answer block, each answer block having at least one display face bearing thereon operator identifiable visual indicia.

4. The electronic instructional apparatus according to claim 3 wherein each one of said answer blocks further for each particular display face, a plurality of corresponding identification surfaces engageable with said detection means, said identification surfaces being disposed upon the sides of said answer block which are perpendicular to said particular display face, said identification surfaces further being disposed upon the portion of each of said perpendicular sides distal to said particular display face whereby said detection means is engaged with said identification surface while said corresponding display face is projecting outwardly from said recess means.

5. The electronic instructional apparatus according to claim 4 wherein each identification surface comprises a plurality of ridges and notches, the arrangement of which represents digital data identifying the indicia appearing upon the display face, said digital data being stored in said memory means.

6. The electronic instructional apparatus according to claim 5 in which said detection means are disposed upon an interior wall of each of said cavities whereby upon insertion of one of said answer blocks into one of said cavities, said answer block is brought into operable engagement with said detection means.

7. The electronic instructional apparatus according to claim 6 in which said detection means comprises a plurality of switches disposed within said cavities, said switches being in alignment and responsive to said ridges and notches of said identification surfaces so as to provide a digital data signal to said processor means representative of the indicia present on said exposed side of said answer block.

8. The electronic instructional apparatus of claim 1 wherein said memory means further includes data corresponding to a plurality of requests to which said operator responses are desired, and correct responses corresponding to said plurality of requests, said operator responses being provided by the insertion of at least one of said indicia disclosure means into said recess means in response to said request.

9. The electronic instructional apparatus according to claim 8 in which said output means comprises:
speech synthesis means operably associated with said memory means and said processor means for providing said plurality of requests and said corresponding correct responses to said operator in synthesized human speech.

10. The electronic instructional apparatus according to claim 8 in which one of said plurality of requests inquires the operator to identify a specific indicia appearing upon at least one particular indicia disclosure means and insert said particular indicia disclosure means into one of said recess means such that said requested indicia appears upon the exposed side of said indicia disclosure means.

11. The electronic instructional apparatus according to claim 8 in which one of said plurality of requests inquires the operator to spell a particular predetermined word thus requiring the operator to identify a specific combination of indicia appearing upon a particular combination of indicia disclosure means and insert said particular combination of indicia disclosure means into said recess means so as to correctly spell said particular predetermined word.

12. The electronic instructional apparatus according to claim 8 in which said plurality of requests include requests for teaching the operator to count by inquiring the operator to insert a specific number of indicia disclosure means into said recess means.

13. The electronic instructional apparatus according to claim 8 in which said indicia disclosure means are of different colors whereby color recognition is taught by one of said plurality of requests for requesting the operator to insert specific numbers of specific colored indicia disclosure means into said recess means.

14. The electronic instructional apparatus according to claim 8 in which said output means produces a predetermined series of audible musical sounds upon insertion of said indicia disclosure means into said recess means wherein said musical sounds correspond to said indicia appearing upon the exposed sides of said indicia disclosure means.

15. The electronic instructional apparatus according to claim 8 in which said output produces a predetermined series of audible animal sounds upon insertion of said indicia disclosure means into said recess means wherein said animal sounds correspond to said indicia appearing upon the exposed sides of said indicia disclosure means.

16. The electronic instructional apparatus according to claim 1 in which said output means provides an indication to the operator of the identity of the indicia upon said exposed side of said indicia disclosure means when one of said indicia disclosure means is inserted into any one of said recess means.

17. An electronic instructional apparatus for developing and testing a preliterate preschool aged operator's associational and coordinational skills, said electronic instructional apparatus comprising:
(a) a housing, said housing including at least two cavities disposed in said housing, each of said at least two cavities having a rectangular opening upon an exterior surface of said housing and extending to an interior portion of said housing;
at least two cubical answer blocks, each of said answer blocks having disposed thereon at least one display face, each display face bearing thereon operator-identifiable visual indicia, wherein each of said cubical answer blocks is capable of insertion into one of said cavities, a display face of said answer block remaining exposed for visual inspection by the operator upon insertion of said answer block, each display face having an indicia and a plurality of identification surfaces corresponding to said indicia, said identification surfaces being disposed upon sides of said answer block which are perpendicular sides distal to said particular display face, each of said identification surfaces including a plurality of ridges and notches, the arrangement of which represents digital data identifying and corresponding to the indicia appearing upon the particular display face corresponding to said identification surface;

(c) detection means operably arranged within each of said cavities for detecting the insertion of said cubical answer blocks into said cavities, and for providing an indication of the identity of said indicia appearing upon said exposed side of said cubical answer block inserted into any one of said cavities, the detection means including a plurality of switches operably arranged upon a wall of each of said cavities, said switches being in alignment with and responsive to said ridges and notches of one of said identification surfaces, when said cubical answer block is inserted into any one of said cavities, to generate a digital data signal representative of the indicia present on the exposed side of said cubical answer block inserted into said cavities;

(d) memory means for storing said digital data corresponding to said indicia appearing upon each display face of each of said cubical answer blocks, and for storing data corresponding to a plurality of predetermined combinations of said indicia which appear upon the exposed display faces of combinations of at least two of said cubical answer blocks upon insertion into said cavities;

(e) processor means operably associated with said memory means and said detection means to receive said digital data signals from said detection means for comparing the identity of said indicia appearing upon said display faces of each of said inserted cubical answer blocks and the identity of combinations of said indicia appearing upon the exposed display faces of said combinations of the inserted cubical answer blocks, with said data stored in said memory means, for providing an indication that said identified indicia appearing on said exposed display faces of said inserted cubical answer blocks is correctly present or incorrectly present as said data stored in said memory means; and (f) output means operably associated with said processor means for providing said operator with an output which is a function of data stored in said memory means.

* * * * *

UNITED STATES PATENT AND TRADEMARK OFFICE
CERTIFICATE OF CORRECTION

PATENT NO. : 4,968,255

DATED : November 6, 1990

INVENTOR(S) : Albert Lee, Wai-Kwok Chew and David T. Cheung

It is certified that error appears in the above-identified patent and that said Letters Patent is hereby corrected as shown below:

| | |
|---|---|
| Col. 1, Line 26 | Delete "systhesis" and instead insert --synthesis-- |
| Col. 5, Line 48 | Delete "respond is" and instead insert --response is-- |
| Col. 6, Line 44 | Delete "for the first" and instead insert --from the first-- |
| Col. 6, Line 57 | Delete "the operation is" and instead insert --the operator is-- |
| Col. 10, Line 32 | Delete "sythesized human" and instead insert --synthesized human-- |

UNITED STATES PATENT AND TRADEMARK OFFICE
CERTIFICATE OF CORRECTION

PATENT NO. : 4,968,255

DATED : November 6, 1990

INVENTOR(S) : Albert Lee, Wai-Kwok Chew and David T. Cheung

It is certified that error appears in the above-identified patent and that said Letters Patent is hereby corrected as shown below:

| | |
|---|---|
| Col. 3, Line 59 | Delete "with said" and instead insert --within said-- |
| Col. 5, Line 33 | Delete "'b'"" and instead insert --'b'".-- |
| Col. 7, Line 61 | Delete ""on" switch "off"" and instead insert --"on" switch 11, "off"-- |
| Col. 9, Line 67 | Delete "systhesis and" and instead insert --synthesis and-- |
| Col. 10, Lines 54 and 55 | Delete "in-dentity" and instead insert --identity-- |
| Col. 10, Line 56 | Delete "said disclosure" and instead insert --said indicia disclosure-- |
| Col. 11, Line 11 | Delete "output means" and instead insert --(f) output means-- |
| Col. 11, Lines 29 and 30 | Delete "further for each" and instead insert --further includes for each-- |
| Col. 12, Line 26 | Delete "in which said" and instead insert --in which one of said-- |
| Col. 12, Line 44 | Delete "which said output produces" and instead insert --which said output means produces-- |

UNITED STATES PATENT AND TRADEMARK OFFICE
CERTIFICATE OF CORRECTION

PATENT NO.   : 4,968,255

DATED        : November 6, 1990

INVENTOR(S)  : Albert Lee, Wai-Kwok Chew and David T. Cheung

It is certified that error appears in the above-identified patent and that said Letters Patent is hereby corrected as shown below:

Col. 12, Line 65    Delete "at least two" and instead insert
                    --(b) at least two--

Signed and Sealed this

Thirteenth Day of October, 1992

Attest:

DOUGLAS B. COMER

Attesting Officer            Acting Commissioner of Patents and Trademarks